United States Patent
Yu et al.

(10) Patent No.: US 10,608,751 B2
(45) Date of Patent: Mar. 31, 2020

(54) RECEPTION OF TWIN SINGLE SIDEBAND SIGNALS USING A MIMO FILTER

(71) Applicant: ZTE Corporation, Shenzhen, Guangdong (CN)

(72) Inventors: Jianjun Yu, Basking Ridge, NJ (US); Junwen Zhang, Broomfield, CO (US); Jianyang Shi, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/920,941

(22) Filed: Mar. 14, 2018

(65) Prior Publication Data

US 2018/0269988 A1 Sep. 20, 2018

Related U.S. Application Data

(60) Provisional application No. 62/471,722, filed on Mar. 15, 2017.

(51) Int. Cl.
| | |
|---|---|
| *H04J 14/00* | (2006.01) |
| *H04B 10/69* | (2013.01) |
| *H04B 10/516* | (2013.01) |
| *H04B 7/0413* | (2017.01) |
| *H04L 25/03* | (2006.01) |
| *H04L 5/00* | (2006.01) |
| *H04B 10/548* | (2013.01) |

(Continued)

(52) U.S. Cl.
CPC ....... *H04B 10/6971* (2013.01); *H04B 7/0413* (2013.01); *H04B 7/0854* (2013.01); *H04B 10/5165* (2013.01); *H04B 10/548* (2013.01); *H04L 5/0007* (2013.01); *H04L 25/03019* (2013.01); *H04L 25/03057* (2013.01); *H04L 25/03968* (2013.01); *H04L 27/2627* (2013.01)

(58) Field of Classification Search
CPC ............ H04B 10/6971; H04B 10/5165; H04B 7/0413; H04L 5/0007; H04L 25/03019
USPC ............................................ 398/43; 375/260
See application file for complete search history.

(56) References Cited

U.S. PATENT DOCUMENTS

| | | | |
|---|---|---|---|
| 8,385,494 B2 * | 2/2013 | Fan ...................... | H04L 27/2657 375/260 |
| 2010/0215371 A1 * | 8/2010 | Djordevia ............. | H03M 13/31 398/79 |

(Continued)

OTHER PUBLICATIONS

King, P.R., et al., "Low Elevation Wideband Land Mobile Satellite MIMO Channel Characteristics," IEEE Transactions on Wireless Communications, 6(7):2712-2720, Jul. 2007.

(Continued)

*Primary Examiner* — Don N Vo
(74) *Attorney, Agent, or Firm* — Perkins Coie LLP

(57) ABSTRACT

A method of digital communication is described. The method includes generating a first orthogonal frequency division multiplexed (OFDM) signal from a first portion of information bits received at the communication apparatus, generating a second OFDM signal from a second portion of information bits received at the communication apparatus, generating a first input for a modulator using the first OFDM signal and the second OFDM signal, generating a second input for the modulator using the second OFDM signal and the second OFDM signal, and operating the modulator to produce a modulated signal from the first input and the second input.

17 Claims, 14 Drawing Sheets

(51) Int. Cl.
H04L 27/26 (2006.01)
H04B 7/08 (2006.01)

(56) References Cited

U.S. PATENT DOCUMENTS

| | | | | |
|---|---|---|---|---|
| 2011/0090992 A1* | 4/2011 | Chung | ............... | H04L 27/0014 375/340 |
| 2014/0169802 A1* | 6/2014 | Magri | ............... | H04B 10/541 398/183 |
| 2015/0155948 A1* | 6/2015 | Chen | ............... | H04B 10/5165 398/188 |

OTHER PUBLICATIONS

Wang, Y., et al., "Transmission and Direct Detection of 300-Gbps DFT-S OFDM Signals Based on O-ISB Modulation with Joint Image-Cancellation and Nonlinearity-Mitigation," 42nd European Conference and Exhibition on Optical Communications (ECOC 2016), VDE, Dusseldorf, Germany, pp. 142-144, Sep. 2016.

Zhang, L., et al., "C-band Single Wavelength 100-Gb/s IM-DD Transmission over 80-km SMF without CD compensation using SSB-DMT," Optical Fiber Communication Conference, OSA Technical Digest (online) (Optical Society of America, 2015), Los Angeles, California, USA, Paper Th4A.2, pp. 1-3, Mar. 2015.

Zhang, L., et al., "Transmission of 112-Gb/s+ DMT over 80-km SMF Enabled by Twin-SSB Technique at 1550nm," European Conference on Optical Communication (ECOC 2015), IEEE, Valencia, Spain, pp. 1-3, Sep. 2015.

Randel, S., et al., "100-Gb/s Discrete-Multitone Transmission Over 80-km SSMF Using Single-Sideband Modulation With Novel Interference-Cancellation Scheme," 2015 European Conference on Optical Communication (ECOC), Valencia, Spain, 3 pages, Sep. 2015.

Rasmussen, J.C., et al., "Digital Signal Processing for Short Reach Optical Links," 2014 European Conference on Optical Communication (ECOC), IEEE, Cannes, France, Paper Tu.1.3.3, pp. 1-3, Sep. 2014.

Wang, Y., et al., "Demonstration of 4×128-Gb/s DFT-S OFDM Signal Transmission over 320-km SMF With IM/DD," IEEE Photonics Journal, 8(2):7903209 (1-9), Apr. 2016.

Wang, Y., et al., "Enhanced Performance of a High-Speed WDM CAP64 VLC System Employing Volterra Series-Based Nonlinear Equalizer," IEEE Photonics Journal, 7(3):7901907(1-7), Jun. 2015.

Yan, W., et al., "80 km IM-DD Transmission for 100 Gb/s per Lane Enabled by DMT and Nonlinearity Management," Optical Fiber Communication Conference, OSA Technical Digest (online) (Optical Society of America, 2014), San Francisco, California, USA, Paper M2I.4, , pp. 1-3, Mar. 2014.

Zhang, L. et al., "Single Wavelength 248-Gb/s transmission over 80-km SMF Based on Twin-SSB-DMT and Direct Detection," European Conference and Exhibition on Optical Communications (ECOC 2016), Dusseldorf, pp. 133-135, Sep. 2016.

\* cited by examiner

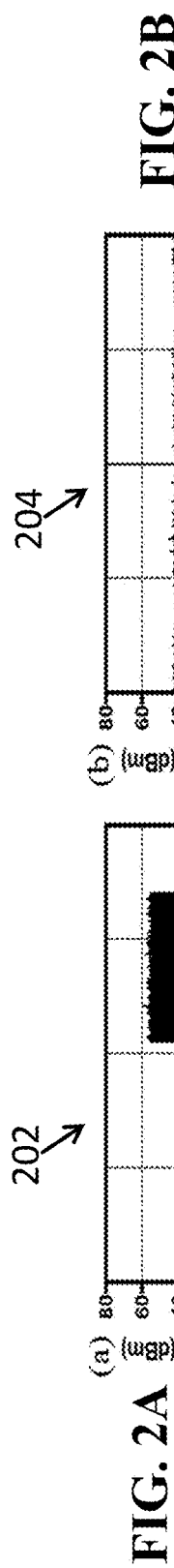
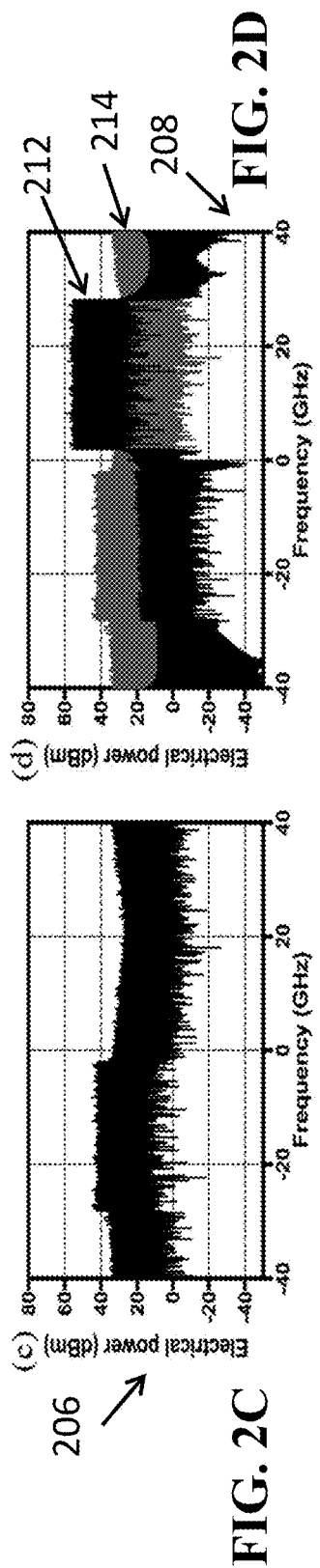
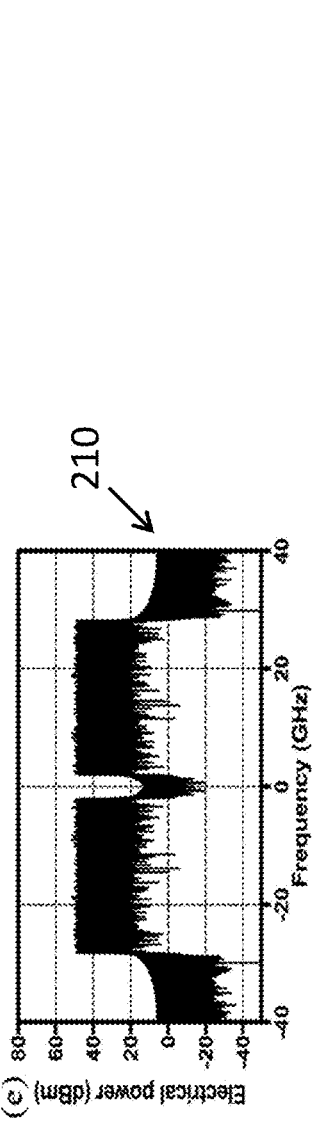
FIG. 2A FIG. 2B FIG. 2C FIG. 2D FIG. 2E

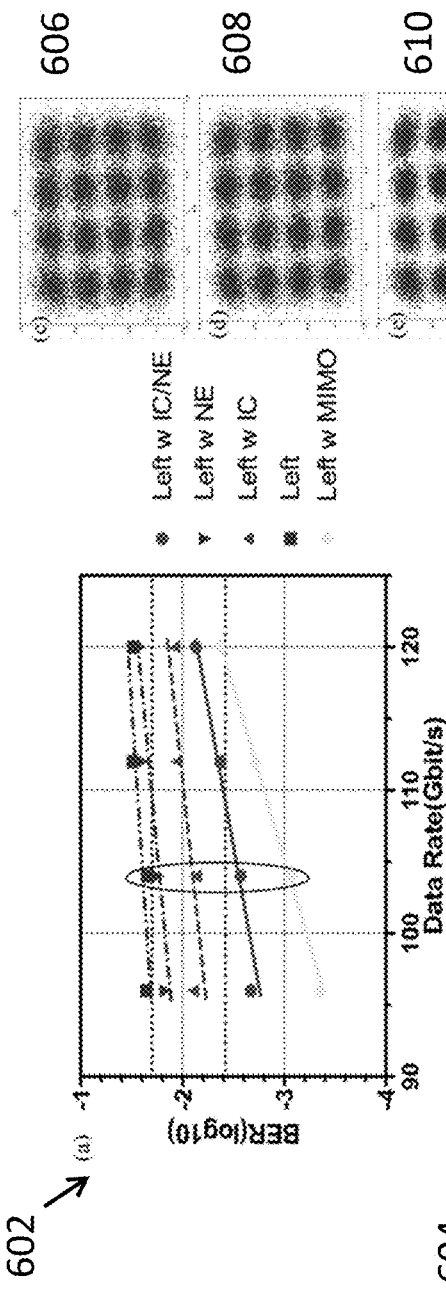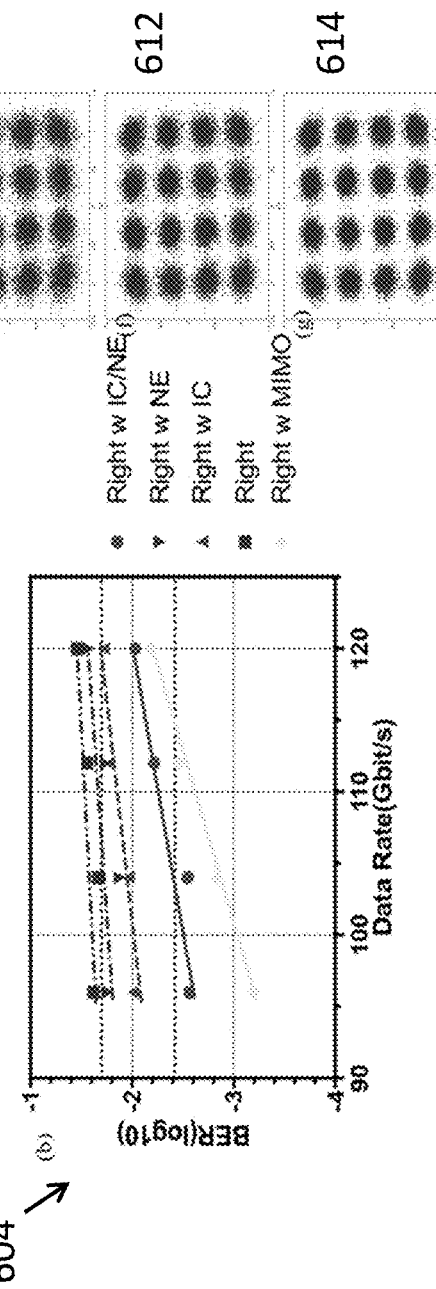

RECEPTION OF TWIN SINGLE SIDEBAND SIGNALS USING A MIMO FILTER

CROSS REFERENCE TO RELATED APPLICATIONS

This patent document claims the benefit of priority of U.S. Provisional Patent Application No. 62/471,722, filed on Mar. 15, 2017. The entire content of the before-mentioned patent application is incorporated by reference as part of the disclosure of this document.

TECHNICAL FIELD

This patent document relates to digital communication, and, in one aspect, to data reception techniques.

BACKGROUND

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which operational and capital expenditure can be reduced.

SUMMARY

The present document discloses techniques for receiving single sideband modulated signals.

In one aspect, a method of digital communication implemented at a communication apparatus, is disclosed. The method includes generating a first orthogonal frequency division multiplexed (OFDM) signal from a first portion of information bits received at the communication apparatus, generating a second orthogonal frequency division multiplexed (OFDM) signal from a second portion of information bits received at the communication apparatus, generating a first input for a modulator using the first OFDM signal and the second OFDM signal, generating a second input for the modulator using the second OFDM signal and the second OFDM signal, and operating the modulator to produce a modulated signal from the first input and the second input.

In another aspect, a method of digital communication is disclosed. The method includes receiving a twin single side band modulated (twin SSB) optical signal carrying information bits, filtering the twin SSB signal to generate a received left signal and a received right signal, operating an expansion series multi-input multi-output (MIMO) equalizer on the received left signal and the received right signal to produce an equalized left signal and an equalized right signal, and demodulating the equalized left signal and the equalized right signal to recover information bits from the received twin SSB signal.

In another aspect, an optical signal reception method is disclosed. The method includes receiving a twin single side band modulated (twin SSB) optical signal carrying information bits, reducing interference between the twin SSBs of the optical signal by applying the twin SSB of the optical signal as multiple inputs of a multi-input multi-output (MIMO) equalizer, reducing nonlinearity by using only nonlinear term of Volterra series expansion of equalized signal at an output of the MIMO equalizer, and demodulating signal resulting from reducing non-linearity to recover information bits from the twin SSB signal.

In another aspect, an optical transmitter apparatus for transmitting information bits over an optical network is disclosed. The apparatus includes a light source that generates a light wave as an optical carrier wave, an orthogonal frequency division multiplexed (OFDM) signal generator that generate a first OFDM signal from a first portion of the information bits and a second OFDM signal from a second portion of the information bits to generate first and second input signals by combining the first and second OFDM signals, and a modulator coupled to the light source and the OFDM signal generator to produce a twin single side band modulated optical signal from the first and second input signals.

In another example aspect, the methods may be embodied as processor-executable code and stored on a computer-readable medium.

In yet another example aspects, these methods may be implemented by communications apparatus that include a memory, a processor, and a transceiver circuit for transmitting and/or receiving data.

These, and other aspects, are disclosed in the present document.

BRIEF DESCRIPTION OF THE DRAWINGS

FIGS. 2A-2E show example electrical domain spectra of first order term (FIG. 2A), second order term (FIG. 2B), third order term (FIG. 2C), both first and third order term (FIG. 2D), and twin-SSB (FIG. 2D).

FIGS. 6A-6B shows bit error rate (BER) versus data rate of left-band SSB (FIG. 6A) and right-band SSB (FIG. 6B). FIGS. 6C-6G show constellations of left band without interference cancellation (IC) and nonlinearity equalization (NE) (FIG. 6C), left band with only NE (FIG. 6D), left band with only IC (FIG. 6E), left band with joint IC and NE (FIG. 6F), and left band with MIMO-Volterra (FIG. 6G).

DETAILED DESCRIPTION

Figure 1:
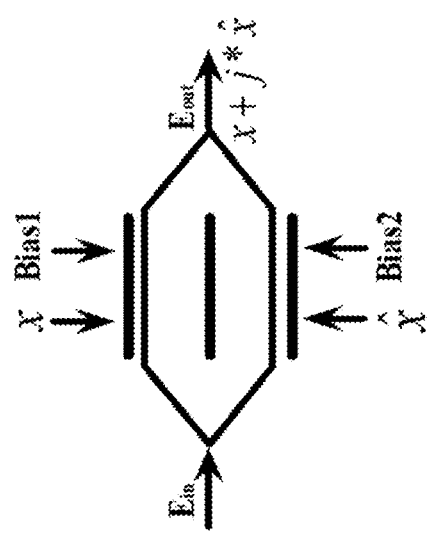
FIG. 1 shows principles of the generation of an optical single side band (SSB) signal based on a dual driver Mach-Zehnder modulators (DD-MZM).

Recently, the demand of ultra-high data rate optical transmission is growing continuously. The social multimedia, mobile front-haul services and other bandwidth-intensive services are constantly posing network capacity challenges. To solve these problems, direct detection (DD) optical transmission is considered an attractive and feasible solution due to the system construction cost, computation complexity and lower power consumption. One of the measures used to judge the effectiveness of a solution is to look at the number of bits per second per wavelength that can be transmitted via a channel. Nowadays, 100 Gb/s/k system is strongly desired for short reach application with DD type optical link, which could utilize single-sideband (SSB) or vestigial-sideband (VSB) to combat the power fading impairment in typical double-sideband (DSB) system.

A 100-G/λ DD transmission has been demonstrated by using discrete multi-tone (DMT) SSB modulation with 80-km standard single mode fiber (SSMF) utilizing I/Q modulator. To further improve the bandwidth efficiency, 200-G/λ twin-SSB transmission over 160-km SSW with discrete Fourier transform spread orthogonal frequency division multiplexing (DFT-S OFDM) has also been reported. However, this implementation still uses I/Q modulator, which contains two Mach-Zehnder modulators (MZMs). Some embodiments can use one dual-driver MZM (DD-MZM) to achieve 100-G/λ twin-SSB transmission with a bit-and-power loading DMT modulation. Although it saves almost half of transmitter cost and doubles the spectral efficiency, the data rate of the twin-SSB generated by DD-MZM do not typically get huge improvement (less than 10%, 145-Gb/s with twin-SSB, 133-Gb/s with conventional SSB at BTB case), because of the nonlinearity and interference in DD-MZM modulator.

The technique provided in this document can be used in some embodiments to achieve, among other uses, a 208-Gb/s/λ DFT-S OFDM transmission over 40-km SSW without chromatic dispersion (CD) compensation. In some disclosed embodiments, a twin-SSB signal is generated by a single commercial DD-MZM. A Multiple Input Multiple Output-Volterra (MIMO-Volterra) algorithm is shown as an example to overcome the interference and nonlinearity penalty of twin-SSB signal in DD-MZM modulator. In general, other MIMO algorithms that address both linear and non-linear terms could be used in place of the Volterra algorithm. Therefore, the MIMO filter could be implemented using any of several well-known series expansions that take into account linear and non-linear distortion terms in signals. Compared with the conventional SSB signal, some embodiments achieve 240-Gb/s/λ of twin-SSB DFT-S OFDM at back-to-back (BTB) case, whereas conventional SSB could only reach 165-Gb/s/λ with the BER less than 1×10$^{-2}$. The results show the feasibility that twin-SSB could double the spectral efficiency and get more than 45% data rate improvement, respectively.

Section headers are used in the description for ease of understanding only and do not limit the discussed technology to any particular section.

Generation of Twin-SSB Signal

FIG. 1 shows an example embodiment that can be used for the generation of an optical single-sideband (OSSB) signal based on a DD-MZM. The output of the DD-MZM can be simplified as I+j*Q. If the electrical signal I is set as real signal x, and signal Q as its Hilbert pair $\hat{x}$. The output of x+k*$\hat{x}$ is the analytic signal of x, and will be a right-band SSB signal. The optical domain expression is:

$$E_{out}=E_{in}*(x+j*\hat{x}) \quad (1)$$

From (1), it can be seen that now it is an optical right-band SSB signal. The left-band SSB signal is expressed by:

$$E_{out}=E_{in}*(y-j*\hat{y}) \quad (2)$$

The twin-SSB signal is expressed as:

$$E_{out} = E_{in} * (x_r + j*\hat{x}_r) + E_{in} * (x_l - j*\hat{x}_l) \quad (3)$$
$$= E_{in} * [(x_r + x_l) + j*(\hat{x}_r - \hat{x}_l)]$$

Two independent DFT-S OFDM signal $x_r$ and $x_l$ are combined to drive the upper arm of DD-MZM, while their Hilbert pairs are subtract to drive the lower arm of DD-MZM. The bias of two parallel phase modulator (PM) in the DD-MZM is driven with a bias difference of $V_\pi/2$.

However, the simplified output of DD-MZM ignores the nonlinearity and interference. The simplified process is expressed as:

$$E_{out} = \frac{\sqrt{2}}{2} E_{in} * \left\{ e^{j*\left[\frac{\pi}{V_\pi}I(t)-\frac{\pi}{2}\right]} + e^{j*\left[\frac{\pi}{V_\pi}Q(t)\right]} \right\} \quad (4)$$

$$= \frac{\sqrt{2}}{2} E_{in} * \left\{ -j * e^{j*\left[\frac{\pi}{V_\pi}I(t)\right]} + e^{j*\left[\frac{\pi}{V_\pi}Q(t)\right]} \right\}$$

$$\approx \frac{\sqrt{2}}{2} E_{in} * \left\{ -j * \left[1 + j * \frac{\pi}{V_\pi}I(t)\right] + \left[1 + j * \frac{\pi}{V_\pi}Q(t)\right] \right\} \quad (5)$$

$$= \frac{\sqrt{2}}{2} E_{in} * \left\{ \frac{\pi}{V_\pi} * [I(t) + j*Q(t)] + 1 - j \right\}$$

Equation (4) represents the output of the DD-MZM in the optical domain. The simplified process from (4) to (5) is utilizing Taylor Expansion of $e^x$. By including higher order terms of the expansion, the output is expressed by:

$$E_{out} \approx \frac{\sqrt{2}}{2} E_{in} * \left\{ \begin{array}{l} -j*\left[1+j*\frac{\pi}{V_\pi}I(t)\right] + \left[1+j*\frac{\pi}{V_\pi}Q(t)\right] - j* \\ \frac{\left[1+j*\frac{\pi}{V_\pi}I(t)\right]^2}{2!} + \frac{\left[1+j*\frac{\pi}{V_\pi}Q(t)\right]^2}{2!} \\ -j*\frac{\left[1+j*\frac{\pi}{V_\pi}I(t)\right]^3}{3!} + \frac{\left[1+j*\frac{\pi}{V_\pi}Q(t)\right]^3}{3!} + \\ \cdots \end{array} \right\} \quad (6)$$

$$= \frac{\sqrt{2}}{2} E_{in} * \left\{ \frac{\pi}{V_\pi} * [I(t)+j*Q(t)] + \frac{\pi^2}{2V_\pi^2} * [j*I(t)^2 - Q(t)^2] + \frac{\pi^3}{6V_\pi^3} * [I(t)^3 - j*Q(t)^3] + 1 - j \right\} \quad (7)$$

Here, (7) has a first order term [I(t)+j*Q(t)], a second order term [j*I(t)$^2$−Q(t)$^2$], and a third order term [I(t)$^3$−j*Q(t)$^3$]. If the electrical signal I is set as real signal x, and signal as its Hilbert pair $\hat{x}$, the first order term in (7) will be a right-band SSB signal. But it is not known how higher order terms have an effect on the signal.

FIGS. 2A-2E show example electrical spectra of different order terms according to some embodiments. The signal is a 26-Gbaud electrical signal. The first order term is the right-band SSB signal in FIG. 2A graph 202. Because of the character of the Hilbert transform, the even number order terms will be the direct current (DC) component in the output (7) as shown in FIG. 2B graph 204. The third order term is the left-band signal as shown in FIG. 2C graph 206, because of the opposite sign symbol. So if the first order term and third order term are put together, the result is as shown in FIG. 2D graph 208, where the curve 212 is the first order term and the curve 214 is the third order term. Compared with the twin-SSB signal in theory shown in FIG. 2E graph 210, there exists a large interference from the right-band SSB signal in the left band. If the higher order terms of the Taylor Expansion are considered, it may be seen that the order of 3, 7, 11, . . . will be the interference in the left band, while the order of 5, 9, 13, . . . will be the nonlinearity in the right band. Without regard to the nonlinearity from the receiver, such as photo detector (PD) or electronic amplifier (EA), the nonlinearity of order 5 term has less effect on the performance compared with the interference of order 3 term. This is why, in some prior art systems, the data rate only achieved 10% increase utilizing twin-SSB with nonlinearity equalization (145-Gb/s with twin-SSB, 133-Gb/s with conventional SSB at BTB case). Similarly, the left-band SSB will also introduce the interference in the right band and the nonlinearity in the left band.

Examples of MIMO-Volterra Equalization Algorithm

In reducing interference and nonlinearity in the twin-SSB system, an embodiment based on the disclosed technology may handle the interference and the nonlinearity separately. For example, the interference between two bands of the signal may be reduced or cancelled by using a MIMO algorithm, in which the two SSB bands are treated as individual inputs of a multiple input system. In addition, the nonlinearity may be reduced or cancelled by using an equalizer that uses an expansion series, such as the Volterra-series, and limits the terms of the expansion to a reasonable number. In particular, a Volterra series may both approximate a response of a nonlinear system and capture a memory effect of devices and/or signal transmission media (e.g., fibers). As a filter (e.g., filter in FIG. 4A) typically cannot match the wavelength correctly, the filtered signal will leak into another band signal. This is sometimes called a linear MIMO effect (distortion). Similarly, the nonlinear part will also be the interference from the other band in practical systems.

Figure 3:
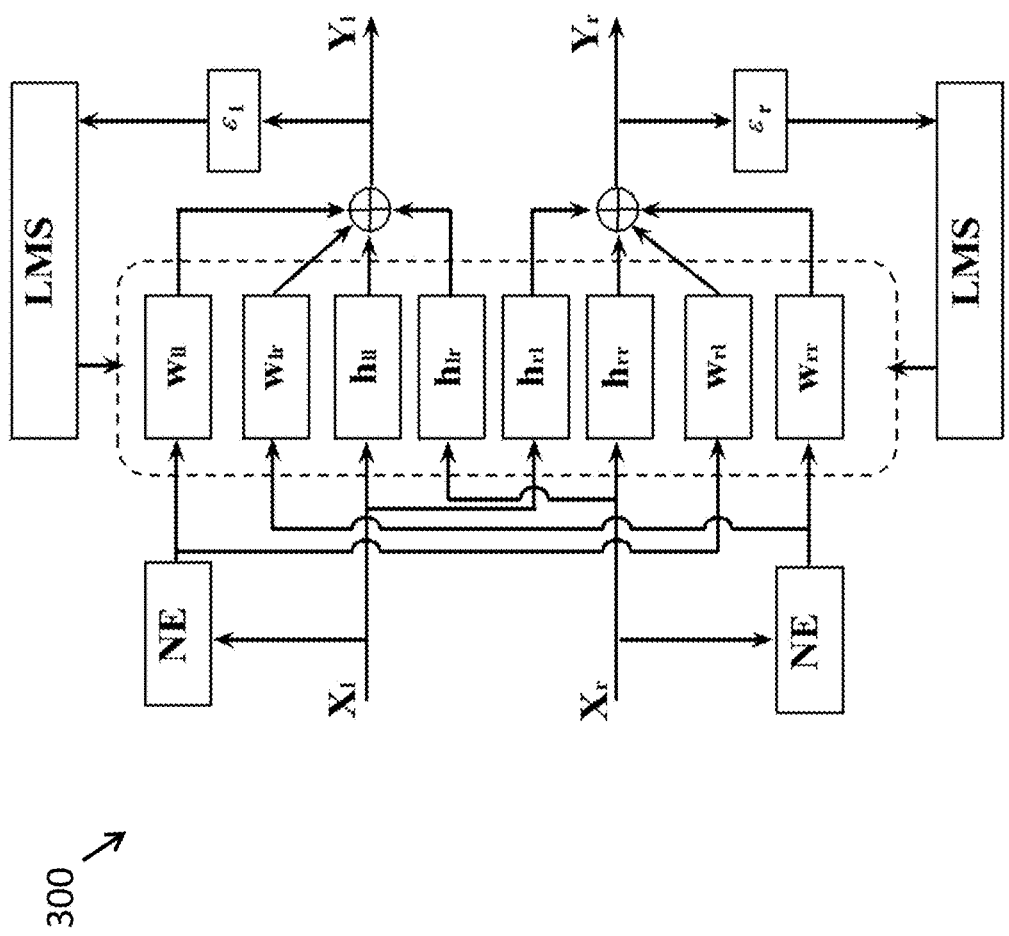
FIG. 3 shows an example structure of a multi-input multi-output (MIMO)-Volterra equalizer.

FIG. 3 shows an example embodiment of a MIMO-Volterra equalizer having two inputs $X_l$ and $X_r$, and two outputs $Y_l$ and $Y_r$.

The Volterra series expansion includes linear and nonlinear terms. Considering a tradeoff between computation complexity and equalization performance, some embodiments may handle the interference by using only the linear term, and only second order term may be taken into calculation. Therefore, the output of the equalizer can be expressed as:

$$y_l(n) = \sum_{i=0}^{N-1} h_{ll}(n)x_l(n-i) + \sum_{i=0}^{N-1} h_{lr}(n)x_r(n-i) + \sum_{k=0}^{L-1}\sum_{i=k}^{L-1} w_{ll}(n)x_l(n-k)x_l(n-i) + \sum_{k=0}^{L-1}\sum_{i=k}^{L-1} w_{lr}(n)x_r(n-k)x_r(n-i)$$

$$y_r(n) = \sum_{i=0}^{N-1} h_{rr}(n)x_r(n-i) + \sum_{i=0}^{N-1} h_{rl}(n)x_l(n-i) + \sum_{k=0}^{L-1}\sum_{i=k}^{L-1} w_{rr}(n)x_r(n-k)x_r(n-i) + \sum_{k=0}^{L-1}\sum_{i=k}^{L-1} w_{rl}(n)x_r(n-k)x_r(n-i)$$

(8)

Here, N and L indicate tap numbers of the linear and nonlinear equalizers. The output of the equalizer may include four terms, which are the linear term, the linear interference term, the nonlinearity term and the nonlinearity interference term. The linear terms are represented by "h" coefficients, and the non-linear terms are represented by "w" coefficients. In some embodiments, training sequences may be used to update weight coefficients by an error optimization criterion such as the Least Mean Square (LMS) error function. In a quasi-static transmission system, the updated weight coefficients may be used for a long time after finishing training (e.g., 1 to 30 minutes).

Figure 4A:
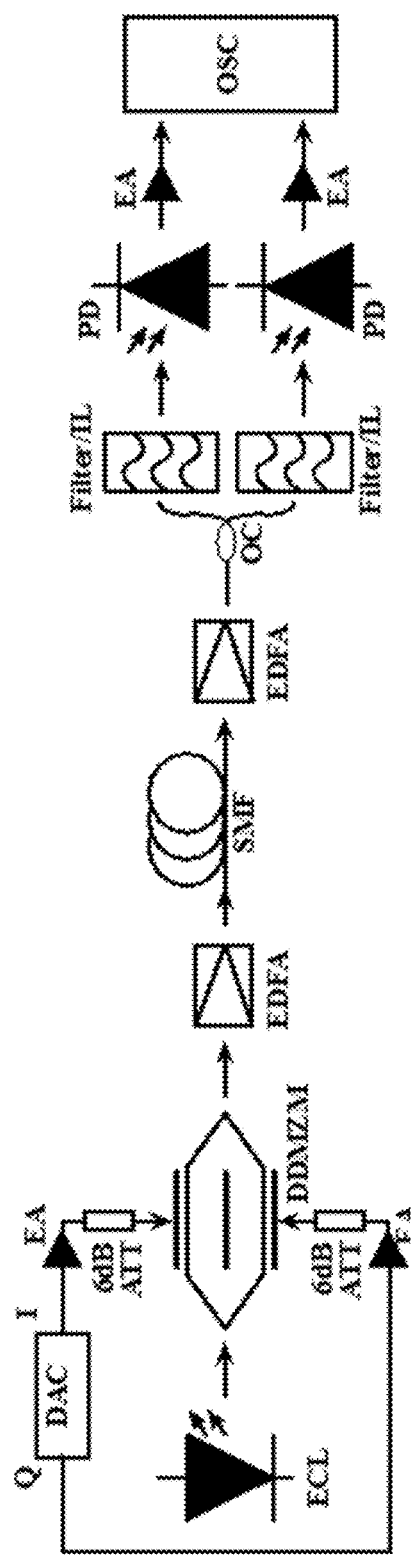
FIGS. 4A, 4B and 4C show example embodiments of a twin-single sideband (SSB) system.
Figure 4B:
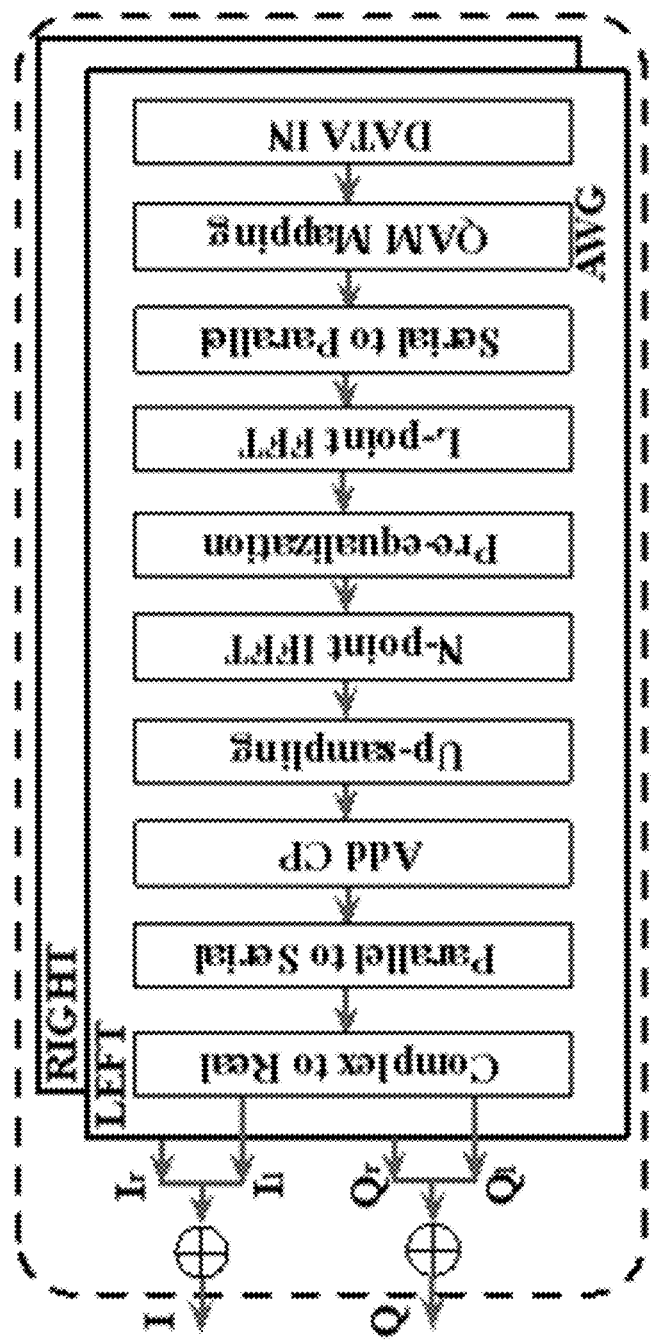
Figure 4C:
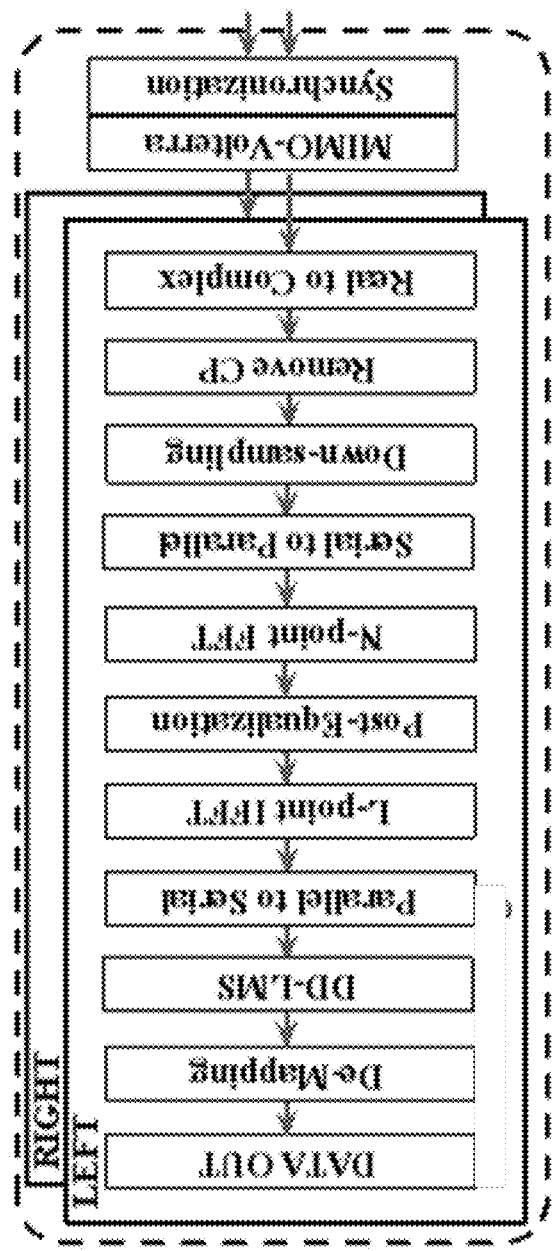

FIGS. 4A, 4B and 4C show an example setup of 208-Gb/s/λ DFT-S OFDM transmission over 40-km SSMF, utilizing twin-SSB modulation. In FIGS. 4A, 4B and 4C, "ECL" indicates an external cavity laser, "EA" indicates an electronic amplifier, "ATT" indicates an attenuator, "DAC" indicates a digital-to-analog converter, "DD-MZM" indicates a dual-driver Mach-Zehnder modulator, "EDFA" indicates an erbium doped fiber amplifiers, "SMF" indicates a single mode fiber, "OC" indicates an optical coupler, "IL" indicates an interleave, "PD" indicates a photo detector, and "OSC" indicates an oscilloscope. FIG. 4A shows an example embodiment of a transmitter that includes an ECL, a DAC, an EA, optional attenuators (ATT) and a modulator (e.g., DD-MZM) to feed a modulated signal into an EDFA. This signal may be transmitted over an optical medium such as a single mode fiber to an optical receiver. The transmitted signal may be processed at the optical receiver in which filters are used to separate individual single sidebands, followed by optical to electrical domain conversion using a photodetector, an optional electrical amplifier and receiver-side demodulation processing (denoted as OSC for an experimental setup).

As depicted in FIG. 4B, with input data being processed from right to left, some embodiments may generate the drive signals for the MZM modulator by an 80 GSa/s digital-to-analog converter (DAC) with 20-GHz bandwidth. For experiments and testing, these signals may be generated with an offline Matlab® program. Before driving the upper and lower arms of DD-MZM, the signals are amplified by electrical amplifiers (EA, 32-GHz bandwidth and 20-dB gain) and 6-dB electrical attenuators are utilized to fit the linear region of the modulator. A continual wave (CW) light at 1549.76-nm is fed into a DD-MZM with 25-GHz optical bandwidth and 1.8-V driving voltage. Before and after 40-km SSMF fiber transmission, two Erbium Doped Fiber Amplifiers (EDFA) are employed to boost the optical signal.

On the receiver-side (FIG. 4A and FIG. 4C), an optical coupler (OC) and an interleave (IL) are used to separate the left-band and right-band optical signals before detected by two 50-GHz photo detectors (PDs). Finally, the signals are sampled by a digital real time oscilloscope with 80-GSa/s sampling rate and 36-GHz electrical bandwidth.

At the transmitter, the data is firstly mapped into complex symbols. Then 2048-point Fast Fourier Transform (FFT) is utilized to generate DFT-S signal and Inverse Fast Fourier Transform (IFFT) is used to generate OFDM signal. A cyclic prefix (CP) is added to alleviate the inter-symbol interference (ISI) incurred by CD. After parallel to serial (P/S) converting, we use subcarrier modulation to generate real-value DFT-S OFDM. In this experiment, the baud rate varies from 24-GBaud to 30-GBaud and the offline digital signal processing (DSP) is applied to demodulate the sampled signal by OSC.

In an example process shown in FIG. 4C, the two data streams of receivers are processed as follows. In the direction from the right to the left of FIG. 4C, the incoming data stream may be synchronized by performing clock synchronization. The synchronized data may be processed through an equalization algorithm, such as the MIMO-Volterra equalization algorithm after the synchronization. The equalized data is then input to the left SSB and right SSB processing chains. In each of the processing, the data needs OFDM demodulation before DFT-S demodulation. The demodulation may be performed by converting samples from real values to complex values, removing cyclic prefix, down-sampling the symbol stream, converting from serial to parallel bit representation and performing N-point FFT. The output of the FFT is then processed through a post-equalizer and converted back to a serial stream by performing an L-point IFFT followed by a parallel to serial conversion. A decision-directed least means square (DD-LMS) stage may be used to obtain equalized symbols which are then de-mapped to recover data being sent by the transmitter side.

For validation and experimentation, the final data is used to measure bit error ratio (BER) performance after de-mapping process. In experimental setups, the inventors used an offline process, implemented on a digital signal processor, to accomplish the tasks described in FIG. 4B. However, in various embodiments, these tasks may be performed suitably using hardware and software implementations.

Figures 5A, 5B, 5C:
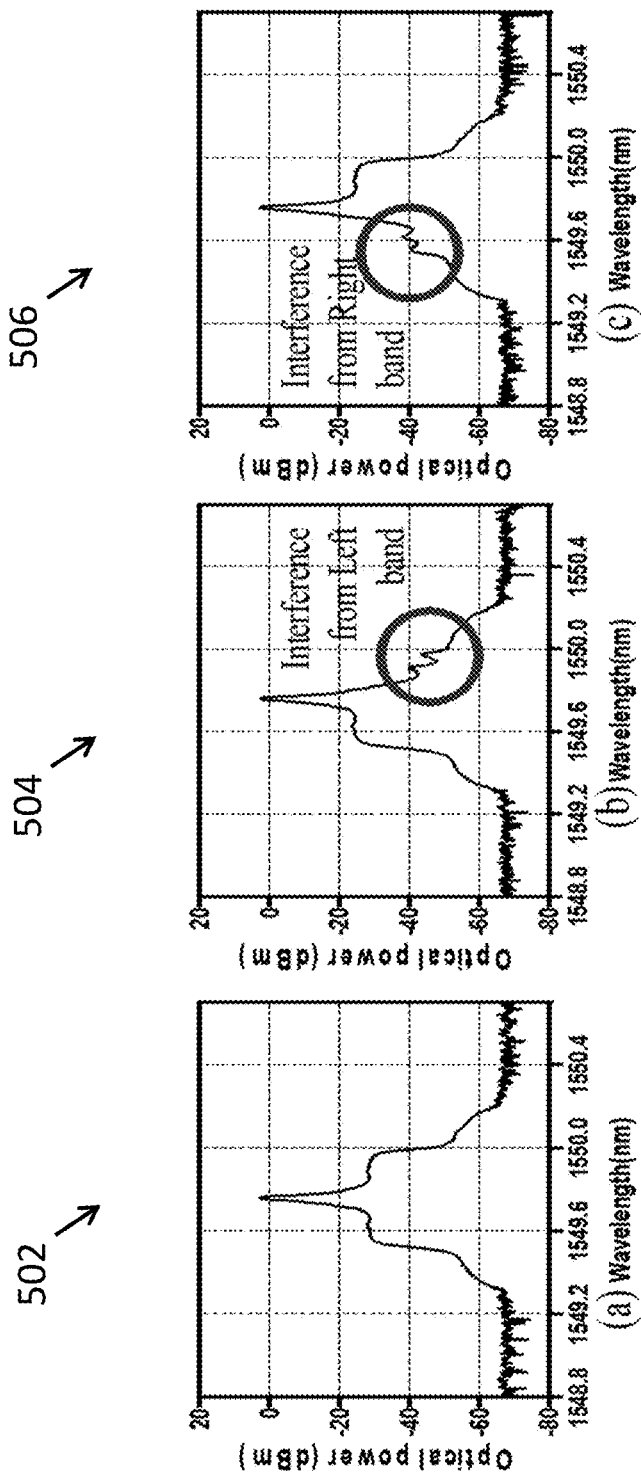
FIGS. 5A-5C show example optical spectra of twin-SSB (FIG. 5A), only left-band SSB (FIG. 5B), and only right-band SSB (FIG. 5C).

FIGS. 5A-5C illustrate the optical spectra of twin-SSB, left-band SSB and right-band SSB. The twin-SSB is generated by two independent SSBs using equation (3), as depicted in an example graph 502 in FIG. 5A. Graphs 504 and 506 in FIGS. 5B and 5C represent conventional SSBs obtained using Eq. (1) and Eq. (2). In graphs 504 and 506, the interference from left and right band signal is apparent. Without combatting this interference, performance of a twin-SSB system will be significantly degraded.

FIGS. 6A-6G show BER performance versus data rate for the left (602) and right (604) band SSB signal at BTB case. FIGS. 6A and 6B show results for back to back bit error rate, and FIGS. 6C-6G show the constellations in the left band for reception without interference cancellation (IC) and nonlinearity equalization (NE) (606), reception with MIMO processing (614), reception with IC only (610), reception with NE only (608) and reception with IC and NE (612). From the constellations in FIGS. 6C-6G, it can be seen that MIMO interference cancellation method has a much larger impact on BER performance than nonlinearity equalization. The performances of left and right band SSB are a little different from one another when they are without MIMO IC, because the IL doesn't match the wavelength. If the MIMO-Volterra is employed, however, the BER performances of both band SSB signals are almost the same.

Figure 7:
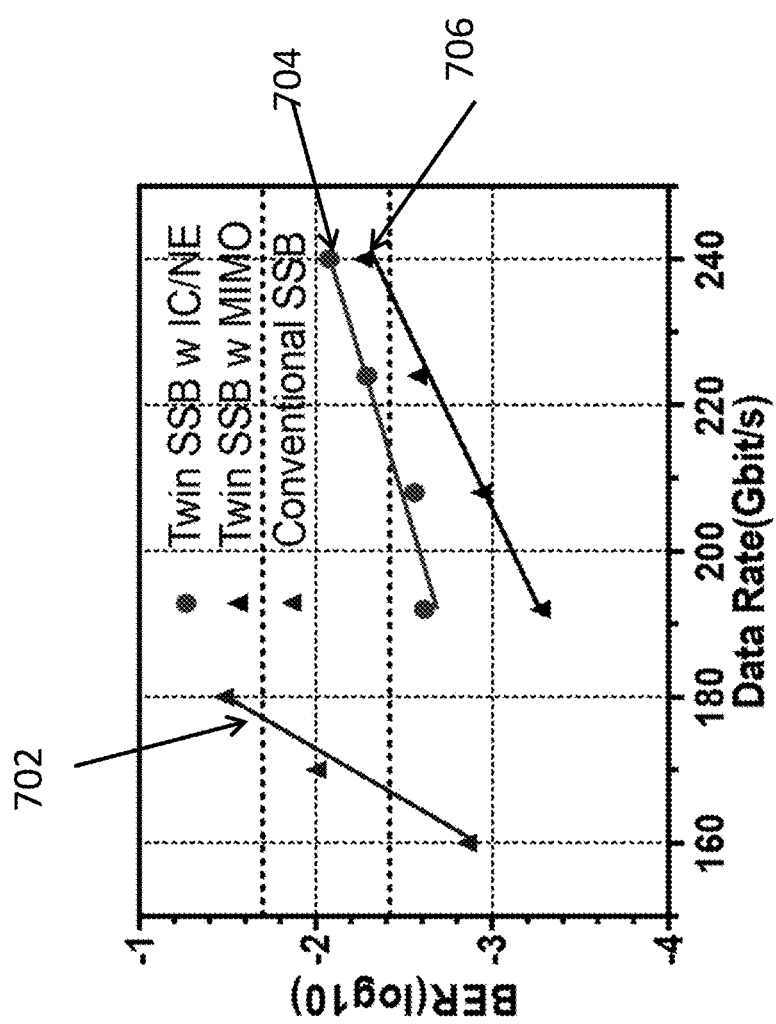
FIG. 7 shows BER performance of twin-SSB signal with IC/NE and with MIMO-Volterra and conventional SSB signal.

FIG. 7 shows BER performance of the twin-SSB (curve 704) and conventional SSB signal (curve 702) at different bit rates. In FIG. 7, the reason why conventional SSB performance (702) has a steeper drop than twin-SSB is that when the data rate is high, conventional SSB generated by using Eq. (1) needs more bandwidth (e.g., 45-GHz bandwidth, 16-QAM) or higher order modulation (e.g., 36-GHz bandwidth, 32-QAM), which may cause the system to reach its operating limit. Even at 240-Gbit/s, however, the bandwidth of the twin-SSB is only 30-GHz and modulation format is only 16-QAM. Joint MIMO-Volterra algorithm (706) based on various embodiments of the disclosed technology can achieve 240-Gb/s/λ of twin-SSB DFT-S OFDM at BTB case, while conventional SSB could only reach 165-Gb/s/λ with the BER less than $1 \times 10^{-2}$. The MIMO-Volterra algorithm shows more than 45% data rate improvement, whereas there is only more than 10% in conventional SSB (e.g., 145-Gb/s with twin-SSB, 133-Gb/s with conventional SSB at BTB case).

Figure 8:
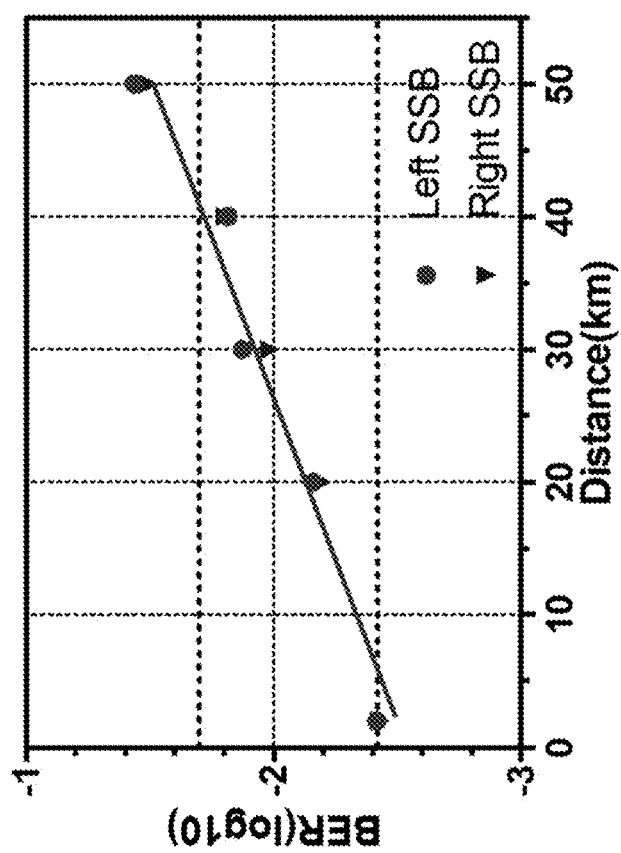
FIG. 8 shows BER versus distance of standard single mode fiber (SSMF) transmission for a twin-SSB signal.

FIG. 8 shows BER versus distance of standard single mode fiber (SSMF) transmission for a twin-SSB signal where 208-Gb/s/λ Discrete Fourier Transform Spreading Orthogonal Frequency Division Multiplexing (DFT-S OFDM) transmission is carried out over 40-km SSMF without chromatic dispersion (CD) compensation at FEC threshold of 2×10-2. The BERs after over 40 km transmission for the left and right band SSB are 1.533×10-2 and 1.574×10-2, respectively. The performances of the left and right band SSB signal are still the same after fiber transmission.

In some embodiments of the disclosed technology, the MIMO-Volterra equalization algorithm may be used to achieve a 208-Gb/s/λ DFT-S OFDM transmission over 40-km SSMF even without CD compensation. Compared with the conventional SSB signal, the MIMO-Volterra equalization algorithm based on some embodiments can achieve 240-Gb/s/λ of twin-SSB DFT-S OFDM in a BTB case, while conventional SSB could only reach 165-Gb/s/λ with the BER less than $1 \times 10^{-2}$. As a result, twin-SSB generated by a commercial DD-MZM can double the spectral efficiency and get more than 45% data rate improvement.

Figure 9:
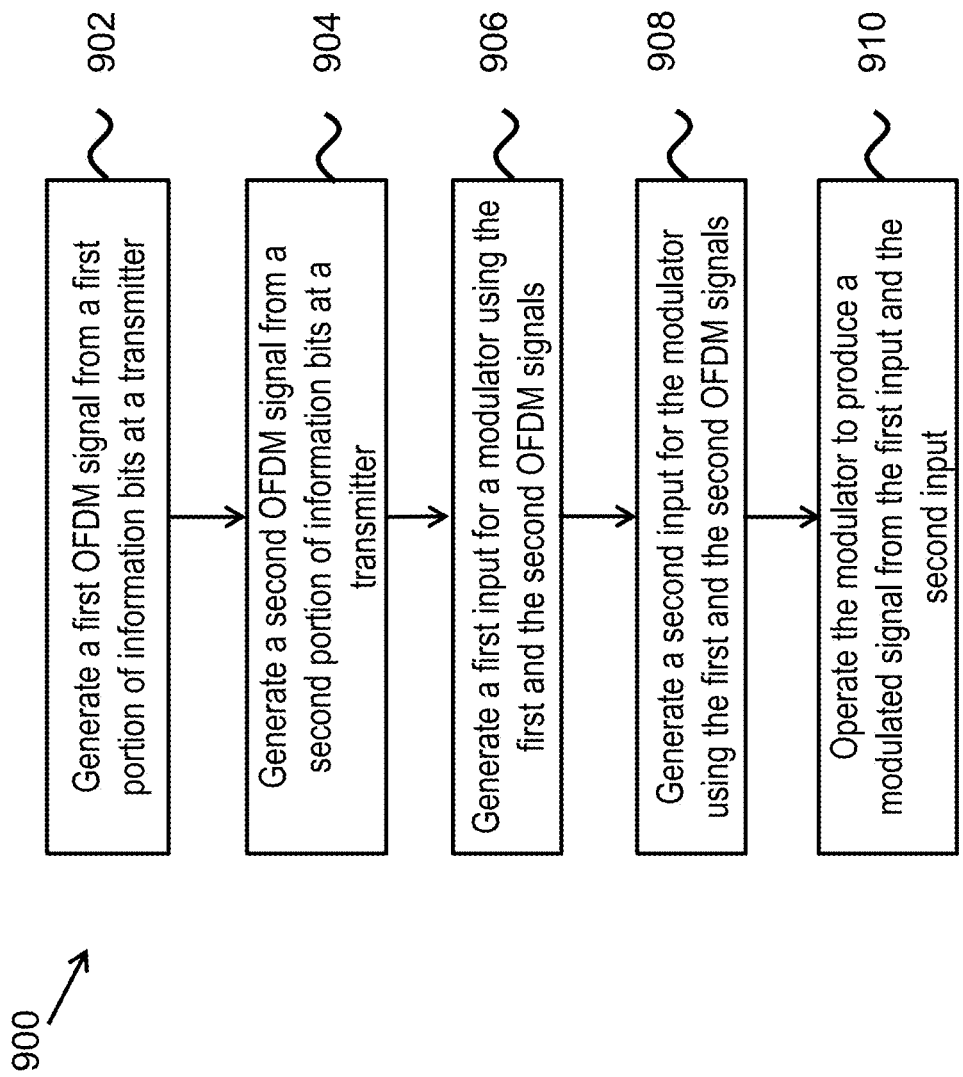
FIG. 9 is a flowchart for an example method of optical communication.

FIG. 9 shows a flowchart of an example method 900 of optical communication. The method 900 may be implemented at a transmitter operable in an optical communication system.

The method 900 includes, at 902, generating a first orthogonal frequency division multiplexed (OFDM) signal from a first portion of information bits received at the communication apparatus.

The method 900 includes, at 904, generating a second orthogonal frequency division multiplexed (OFDM) signal from a second portion of information bits received at the communication apparatus.

The method 900 includes, at 906, generating a first input for a modulator using the first OFDM signal and the second OFDM signal.

The method 900 includes, at 908, generating a second input for the modulator using the second OFDM signal and the second OFDM signal.

The method 900 includes, at 910, operating the modulator to produce a modulated signal from the first input and the second input.

In various embodiments, as described with respect to FIG. 1 to FIG. 4B, a DD-MZM modulator may be used and driven by an upper and a lower signal as described previously. For example, in some embodiments, the operation in 906 may include generating the first input by additively combining the first and the second OFDM signals, while the second input may be generated by subtracting Hilbert transforms of the first second OFDM signals from each other. In some embodiments, the modulator may be a DD-MZM modulator that is operated at its $V_\pi/2$ bias point.

Figure 10:
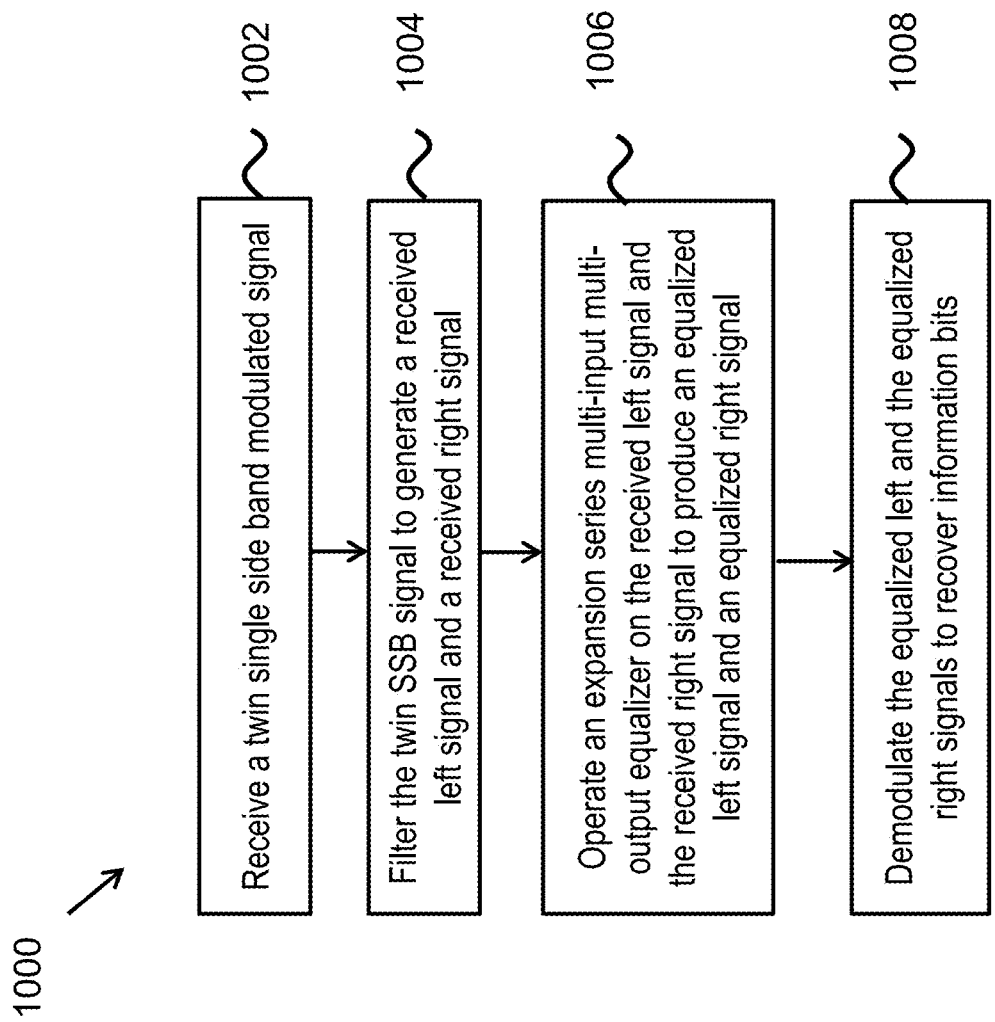
FIG. 10 is a flowchart for another example method of optical communication.

FIG. 10 is a flowchart representation of another method 1000 of optical communication in which an optical signal is received and information bits are extracted from the optical signal.

The method 1000 includes, at 1002, receiving a twin single side band modulated (twin SSB) optical signal carrying information bits.

The method 1000 includes, at 1004, filtering the twin SSB signal to generate a received left signal and a received right signal. The twin SSB signal may be generated using the technique described with respect to method 900.

The method 1000 includes, at 1006, operating an expansion series multi-input multi-output (MIMO) equalizer on the received left signal and the received right signal to produce an equalized left signal and an equalized right signal. As described, in various embodiments, expansion series such as the Volterra series may be used for obtaining coefficient models of linearities and nonlinearities and these coefficients may be adaptively updated. Other examples of series that could be used are a Taylor series expansion or a Wiener series expansion.

The method 1000 includes, at 1008, demodulating the equalized left signal and the equalized right signal to recover information bits from the received twin SSB signal.

Figure 11:
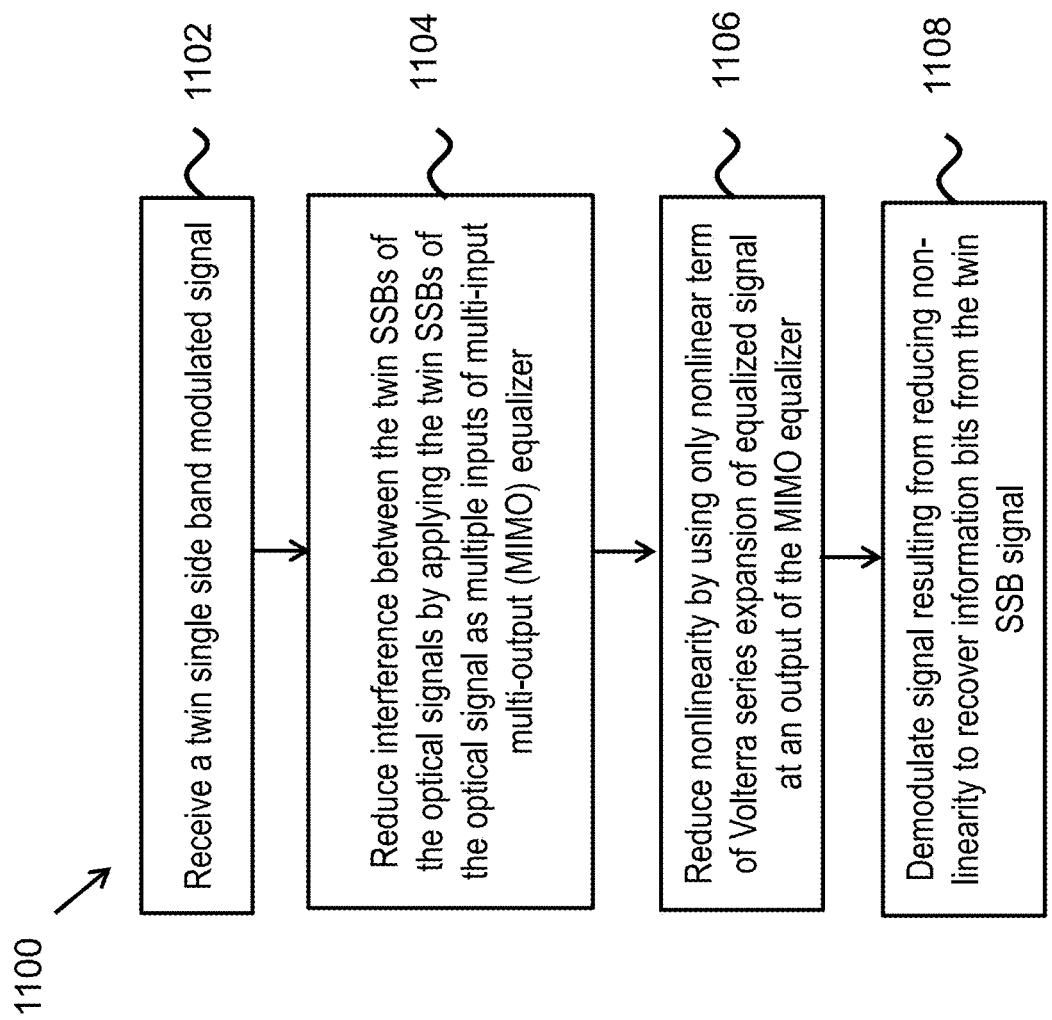
FIG. 11 is a flowchart for another example method of optical communication.

FIG. 11 is a flowchart representation of another method 1100 of optical communication in which an optical signal is received and information bits are extracted from the optical signal.

An optical signal reception method may include receiving, at 1102, a twin single side band modulated (twin SSB) optical signal carrying information bits, reducing, at 1104, interference between the twin SSB optical signals by applying the twin SSB of the optical signal as multiple inputs of multi-input multi-output (MIMO) equalizer, reducing, at 1106, nonlinearity by using only nonlinear term of Volterra series expansion of equalized signal at an output of the MIMO equalizer, and demodulating, at 1108, signal resulting from reducing non-linearity to recover information bits from the twin SSB signal.

It will be appreciated that A MIMO-Volterra Equalizer is proposed to overcome the interference and nonlinearity penalty of twin-SSB signal. Adopting above methods, we achieve 240-Gb/s/λ of twin-SSB DFT-S OFDM signal at BTB case, while conventional SSB could only reach 165-Gb/s/λ with the BER less than $1\times10^{-2}$, which double the spectral efficiency and get more than 45% data rate improvement. We experimentally demonstrate 208-Gb/s/λ DFT-S OFDM transmission over 40-km standard single mode fiber without chromatic dispersion compensation utilizing low cost direct-detection architecture based on dual-driver Mach-Zehnder modulator.

Figure 12:
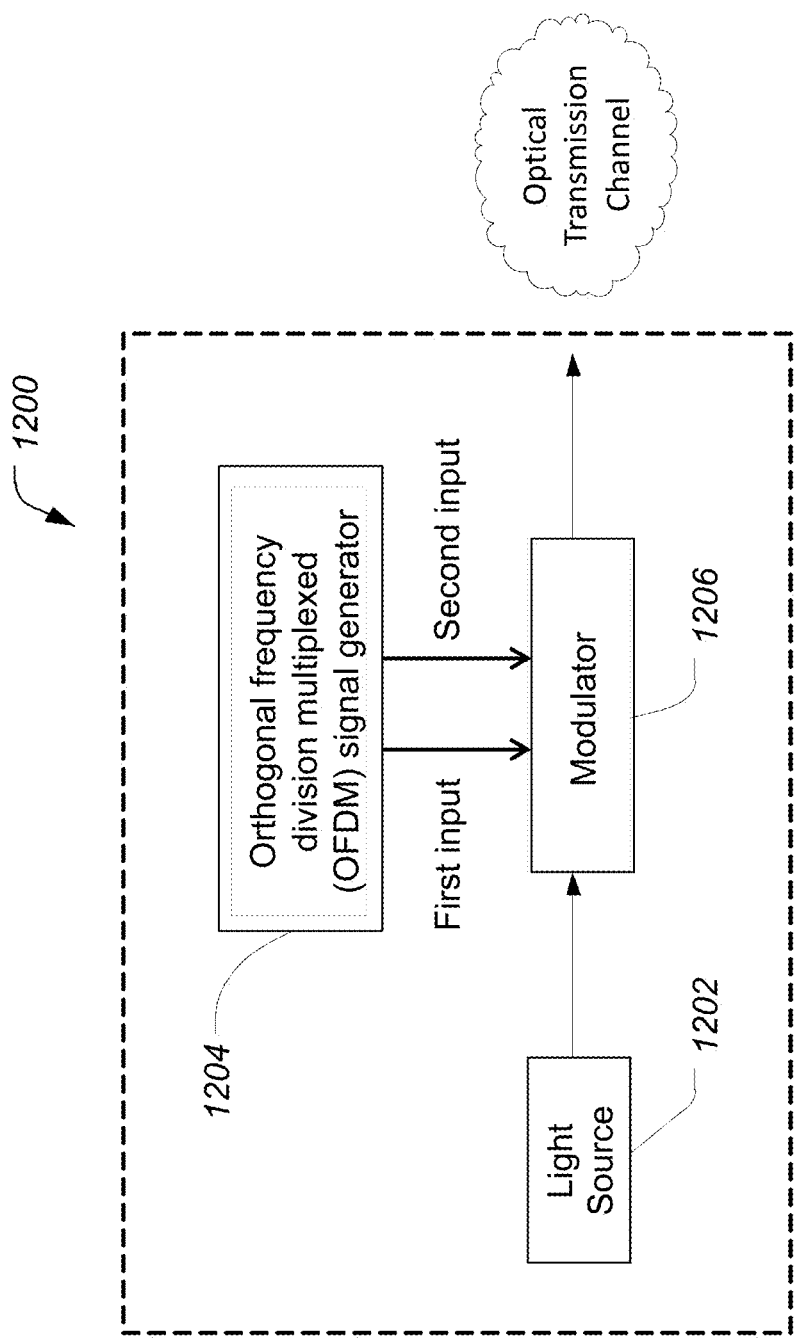
FIG. 12 shows an example optical transmitter apparatus 1200 for transmitting information bits over an optical network.

FIG. 12 shows an example optical transmitter apparatus 1200 for transmitting information bits over an optical network. The optical transmitter apparatus 1200 in accordance with an embodiment of the disclosed technology includes a light source 1202 that generates a light wave as an optical carrier wave, an orthogonal frequency division multiplexed (OFDM) signal generator 1204 that generate a first OFDM signal from a first portion of the information bits and a second OFDM signal from a second portion of the information bits to generate first and second input signals by combining the first and second OFDM signals, and a modulator 1206 coupled to the light source and the OFDM signal generator to produce a twin single side band modulated optical signal from the first and second input signals.

In an embodiment of the disclosed technology, an optical receiver apparatus may include a memory that stores instructions, and a processor that reads the instructions from the memory and implements a method discussed in this patent document. In another embodiment of the disclosed technology, a computer-readable program medium may be provided. The computer-readable program medium may include processor-executable code stored thereupon, and the code, when executed, may cause a processor in a digital communication receiver to implement a method discussed in this patent document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of digital communication implemented at a communication apparatus, comprising:
    generating a first orthogonal frequency division multiplexed (OFDM) signal from a first portion of information bits received at the communication apparatus;
    generating a second orthogonal frequency division multiplexed (OFDM) signal from a second portion of information bits received at the communication apparatus;
    generating a first input for a modulator using the first OFDM signal and the second OFDM signal;
    generating a second input for the modulator using the first OFDM signal and the second OFDM signal; and
    operating the modulator to produce a modulated signal from the first input and the second input,
    wherein the generating the second input includes generating the second input by subtractively combining a Hilbert transformed version of the first OFDM signal and a Hilbert transformed version of the second OFDM signal.

2. The method of claim 1, wherein the generating the first input includes generating the first input by additively combining the first OFDM signal and the second OFDM signal.

3. The method of claim 1, wherein the modulator is a Mach Zehnder Modulator (MZM) and wherein the method further includes driving the MZM at a $V_\pi/2$ bias difference.

4. An optical signal reception method, comprising:
    receiving a twin single side band modulated (twin SSB) optical signal carrying information bits;
    filtering the twin SSB signal to generate a received left signal and a received right signal;
    operating an expansion series multi-input multi-output (MIMO) equalizer on the received left signal and the received right signal to produce an equalized left signal and an equalized right signal; and
    demodulating the equalized left signal and the equalized right signal to recover information bits from the received twin SSB signal,
    wherein the expansion series MIMO equalizer comprises, for each output, a first adaptive filter for equalizing an in-band channel distortion, a second adaptive filter for equalizing a cross-channel distortion and a third adaptive filter for equalizing a non-linear distortion.

5. The method of claim 4, wherein the third adaptive filter for equalizing the non-linear distortion comprises using a Volterra series expansion coefficient of a mathematical model of the corresponding output.

6. The method of claim 5, wherein using a Volterra series expansion coefficient includes using only a nonlinear term of the Volterra series expansion.

7. The method of claim 4, wherein the expansion series MIMO equalizer is adaptively optimized using a least means square error criterion.

8. An optical signal reception method, comprising:
    receiving a twin single side band modulated (twin SSB) optical signal carrying information bits;
    reducing interference between the twin SSBs of the optical signal by applying the twin SSB of the optical signal as multiple inputs of a multi-input multi-output (MIMO) equalizer;
    reducing nonlinearity by using only nonlinear term of Volterra series expansion of equalized signal at an output of the MIMO equalizer; and
    demodulating signal resulting from reducing non-linearity to recover information bits from the twin SSB signal.

9. The method of claim 8, wherein the MIMO equalizer comprises, for each output, a first adaptive filter for equalizing an in-band channel distortion, a second adaptive filter for equalizing a cross-channel distortion and a third adaptive filter for equalizing a non-linear distortion.

10. The method of claim 8, wherein the MIMO equalizer is adaptively optimized using a least means square error criterion.

11. The method of claim 8, wherein the demodulating the signal resulting from reducing non-linearity includes:
    converting samples from real values to complex values;
    removing cyclic prefix;
    down-sampling a symbol stream;
    converting from serial to parallel bit representation; and
    performing N-point Fast Fourier Transform (FFT).

12. The method of claim 11, wherein an output of the FFT is processed by:
    performing a post-equalization;
    performing a parallel to serial conversion;
    obtain equalized symbols by using a decision-directed least means square (DD-LMS) stage; and
    de-mapping the equalized symbols to recover data.

13. An optical transmitter apparatus for transmitting information bits over an optical network, comprising:
    a light source that generates a light wave as an optical carrier wave;
    an orthogonal frequency division multiplexed (OFDM) signal generator that generate a first OFDM signal from a first portion of the information bits and a second OFDM signal from a second portion of the information bits to generate first and second input signals by combining the first and second OFDM signals; and a modulator coupled to the light source and the OFDM signal generator to produce a twin single side band modulated optical signal from the first and second input signals, wherein the second input signal is generated by subtractively combining a Hilbert transformed version of the first OFDM signal and a Hilbert transformed version of the second OFDM signal.

14. The apparatus of claim 13, wherein the first input signal is generated by additively combining the first OFDM signal and the second OFDM signal.

15. The apparatus of claim 13, wherein the modulator is a dual-drive Mach Zehnder Modulator (DD-MZM).

16. The apparatus of claim 15, wherein the DD-MZM includes two parallel phase modulators that are driven with a bias difference of $V_\pi/2$.

17. The apparatus of claim 15, wherein the first input signal drives an upper arm of the DD-MZM and the second input signal drives a lower arm of the DD-MZM.

* * * * *